Nov. 6, 1945.   J. G. ZIEGLER   2,388,457
CONTROLLING SYSTEM
Filed May 21, 1942
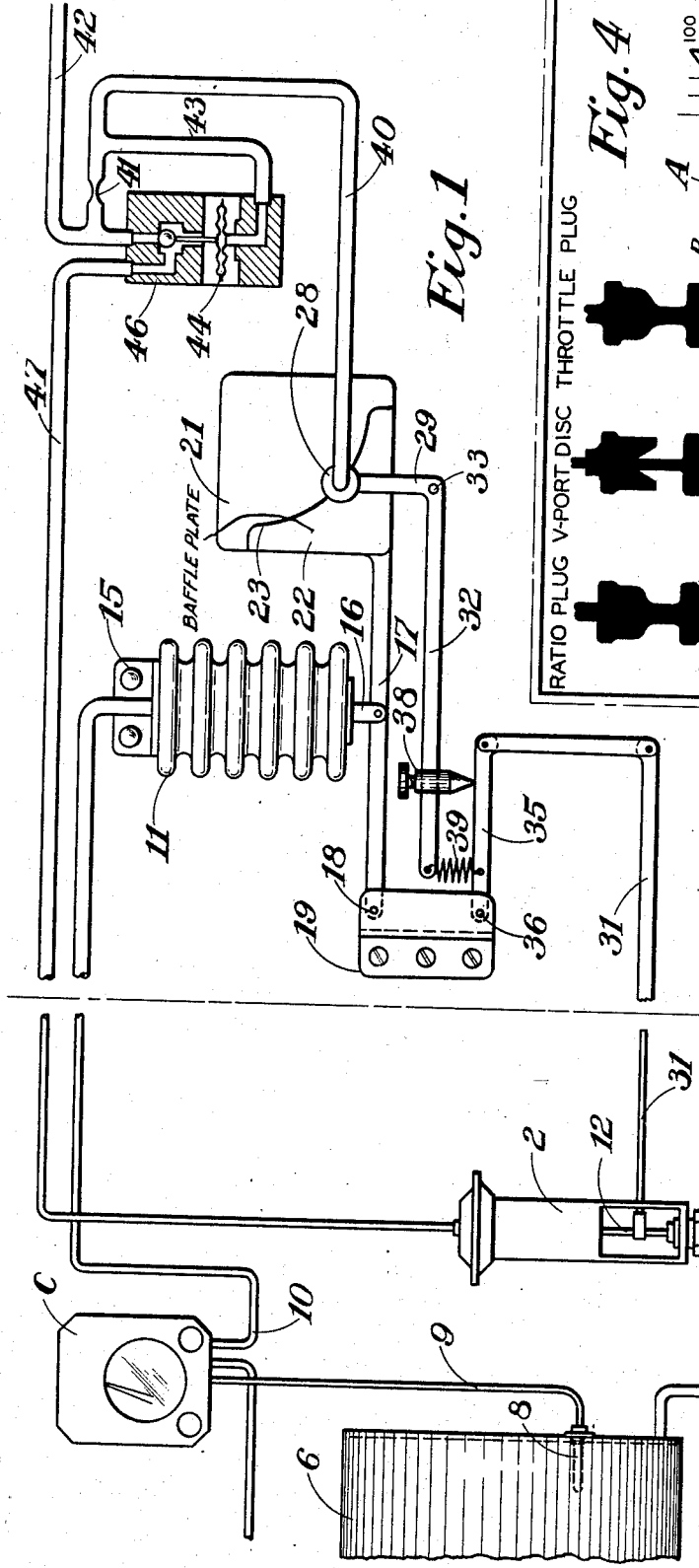
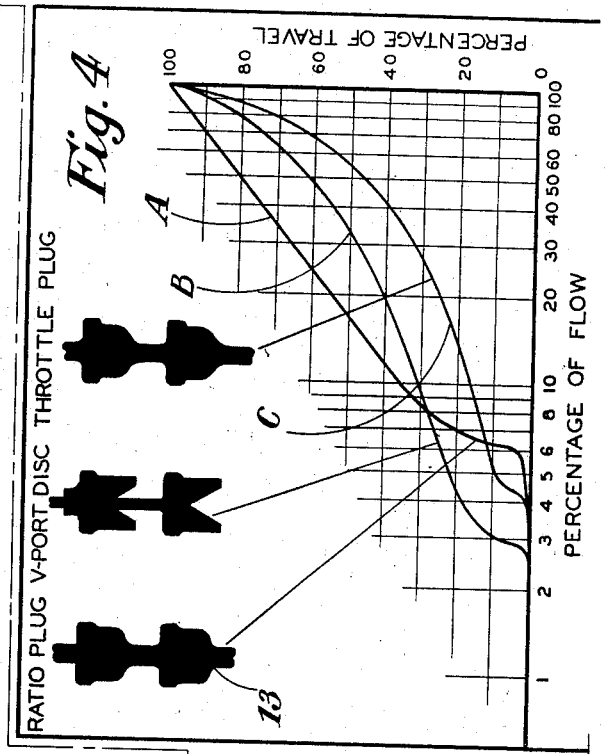
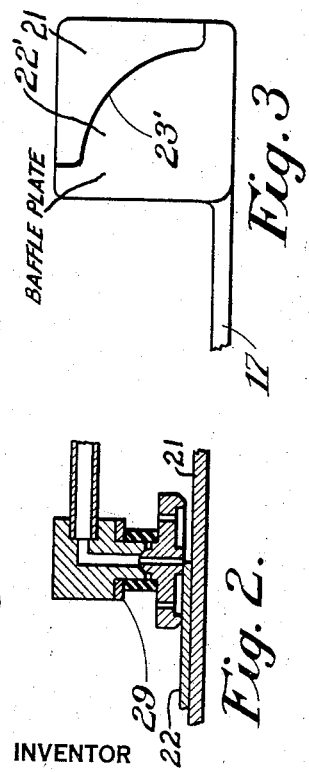
INVENTOR
J. G. ZIEGLER
BY D. Clyde Jones
ATTORNEY Patented Nov. 6, 1945

2,388,457

UNITED STATES PATENT OFFICE 2,388,457

CONTROLLING SYSTEM

John G. Ziegler, Rochester, N. Y., assignor to Taylor Instrument Companies, Rochester, N. Y., a corporation of New York Application May 21, 1942, Serial No. 443,977

11 Claims. (Cl. 236—82)

This invention relates to controlling systems, and to mechanisms for use therein.

In such systems control conditions have either required or else customers have demanded that the controlling medium be applied according to various functions of the movement of the condition-sensing mechanism. In the past, where the control medium was a fluid, its application was governed by different types of valves, a different type of valve disc or plug being required for each different function to be satisfied. Thus, in addition to various valve sizes, various types of valves were also required. In other words, a different type of valve was required for each different functional relation between the movement representing the measurement of the condition-sensing unit and the consequent change in flow of fluid resulting from the movement of the controlling valve.

In these different types of valves, the movable portions thereof, included plugs having different contours. Not only were these valve plugs difficult to manufacture because of these various contours which had to be finished to close tolerances, but they were also difficult to maintain in operation, because the accumulation of scale on the surfaces of the plugs or corrosion threeof, modified the desired contours of the plugs and therefore changed the resulting flow characteristics through the valves.

In accordance with the present invention, it is proposed to use a single type of valve such as one having a beveled disc and to utilize means cooperating therewith to control the position of the valve disc so that the position of this disc and therefore the flow of fluid through the valve may be varied according to any desired function of changes in the condition to be controlled.

For a clearer understanding of the invention, reference is made to the drawing in which Fig. 1 is a diagrammatic showing of the present control system; Fig. 2 is a sectional detail view of the nozzle and baffle with its support, used in the system; Fig. 3 is a view of a fragment of the baffle support with a baffle plate of alternative shape mounted thereon; and Fig. 4 is a chart useful in describing the invention.

Referring to the drawing, the invention is incorporated in a temperature controlling system in which a conventional controller C governs the opening and closing of a valve V. The valve controls the flow of a temperature correcting medium through the pipe 5 leading into a tank 6. This controller, which may be of the construction disclosed in Fig. 1 of the Foote Patent No. 2,088,055, granted July 27, 1937, includes a thermo-sensitive bulb 8 exposed to the material in a tank 6, the bulb communicating through a capillary tube 9 with the mechanism (not shown) of the controller C. In response to temperature deviations at the bulb 8, the controller C, as will be understood by reference to the mentioned patent, controls the application of compressed air through a conduit such as 10. As herein illustrated conduit 10 terminates in a bellows 11 which actuates relay mechanism, to be described, for adjusting the valve stem 12 of the valve V.

In previous systems when it was desired to change the functional relation between the temperature deviation and the amount of correcting medium passed through a valve such as V, this change was achieved by using different valves having valve closure elements or plugs 13 of different predetermined contours. For example, in the chart of Fig. 4 of the drawing, there are illustrated graphs A, B and C, showing the functional relation between the movement representing the measurement of the condition-sensing unit and the consequent movement of the controlling valve stem when valve plugs of different contours illustrated, are employed in a controlling system. It will be appreciated that when the valve closure element departs from the simple beveled valve disc as shown in the valve V, to the form of a plug, the cost of the valve is increased substantially. Furthermore, corrosion or the accumulation of scale on the surface of such a plug will change its predetermined characteristics. It will be further understood that a valve plug of different contour is required for each different change in the mentioned ratio and consequently the resulting number of valves that a manufacturer must keep in stock to satisfy such requirements, was inconveniently large.

In accordance with the present invention, it is proposed to utilize a valve V having a simple beveled valve disc and to actuate this disc in such a manner as to obtain any desired functional relation or ratio between the controlling movement representing the measurement of a condition sensing unit and the consequent opening through the valve. This result is obtained with this valve by moving the valve disc thereof, to cause the flow through the valve to conform to the mentioned relation.

In this arrangement, mechanism interposed between the controller and the valve V translates the controlling movement of bellows 11 into a movement of the valve disc in the valve V, to satisfy the mentioned relation. This mechanism, greatly enlarged as compared to the valve V, is shown at the right of the broken line in Fig. 1, being mounted within a case fixed to the frame of the valve by a suitable bracket (not shown). This mechanism includes the previously mentioned bellows 11 which is secured at its upper end to a fixed bracket 15, in turn, mounted on an inner wall (not shown) of the case. The lower or free end of this bellows terminates in a lug 16 pivotally connected to a baffle lever 17 which, in turn, is pivoted at one of its ends at 18 on the bracket 19. The other end of the baffle lever is provided with a generally rectangular baffle support 21 on one vertical face of which there is attached a baffle plate 22 provided with a cam-like edge 23. It will be understood that in practice, the manufacturer will make up a series of baffle plates each having a different cam edge 23 for each of the various flow characteristics. When the edge 23 of the baffle plate is concave as shown in Fig. 1, it will function with a valve V which is closed by the application of compressed air to its motor diaphragm. However, when the edge 23' of the baffle plate 22' is convex as shown in Fig. 3, this plate will function with a valve which opens when compressed air is applied to its motor diaphragm.

A nozzle 28 directs its jet of escaping compressed air against the vertical face of the baffle in the region of said edge. This nozzle is mounted on the free end of the arm 29 of an angular nozzle lever which is pivoted at 33 on a fixed support. The other arm 32 of this lever is arranged to be actuated by or in response to the movement of the valve stem of the main controlling valve V. As herein shown, a bracket 31 is attached at its left end to the valve stem 12 of valve V, while the right end of the bracket is linked to one end of an arm 35. This arm has its other end pivotally mounted at 36 on a support to swing in a plane common to the baffle lever 17 and to the lever arms 29, 32. A fulcrum member 38 is adjustable to different positions along the arm 32 to engage different portions of arm 35 in order to determine the amount of movement or stroke of the nozzle for any given movement of the valve stem 12.

The nozzle 28 communicates through a conduit 40 and orifice 41, with the supply conduit 42, while the branch 43 of the conduit 40 communicates with the capsular chamber 44 of the relay valve 46. Valve 46 controls the application of compressed air from supply conduit 42 through conduit 47 to the diaphragm motor top of valve V.

In the operation of the system, let it be assumed that the temperature of the liquid surrounding the bulb 8 rises above the given control point. As a result of this rise, the controller operates in the well-known manner to apply increased air pressure through conduit 10 to the bellows 11. This causes bellows 11 to expand which, in turn, swings the baffle lever 17 and the baffle plate 22 mounted thereon, in a clockwise direction. This movement of the baffle plate tends to uncover the nozzle 28 so that the air pressure in conduit 40, branch conduit 43 and capsular chamber 44, is reduced. Capsular chamber 44 contracts to open relay valve 46 so that increased air pressure is applied to the motor of valve V. This motor forces the valve stem 12 and its valve disc downward, tending to reduce the amount of heating medium introduced into the tank. The downward movement of the valve stem causes the bracket 31 to swing the arm 35 in a clockwise direction. The arm 32 of the nozzle lever under the action of the spring 39 follows the arm 35, tending to swing the nozzle lever in a counterclockwise direction. This movement of the nozzle lever advances the nozzle with respect to the baffle plate so that escape of air through the nozzle is reduced. Consequently air pressure in conduit 40, branch conduit 43 and capsular chamber 44 increases. Chamber 44 expands, tending to close relay valve 46. This operation of the relay valve reduces the compressed air supplied to the motor of valve V which now tends to open slightly. Thus when the bulb 8 is exposed to a range of temperature sufficient to move the disc of valve V from its fully open to its fully closed position, the baffle plate and the nozzle will interact as just described. The overall effect of this interaction is that as the baffle plate swings downward, the nozzle will travel upward along the sloping contour of the cam-like edge 23 of the baffle plate. Since the baffle-nozzle relation controls the relay valve 46, which in turn controls the operation of the main valve V, it will be understood that the contour of the cam-like edge of the baffle plate determines the functional relation between the temperature at the bulb 8 and the resulting position of the disc of valve V.

A change in temperature in the opposite direction causes the system to operate in the same manner but in the opposite sense. From the foregoing description it should be understood that the position of the valve disc of valve V is determined jointly by the temperature and by the contour of the baffle plate.

What I claim is:

1. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, a pneumatic control couple including a baffle element and a nozzle element, the space relation between said elements governing the application of pressure fluid to effect the movement of said valve, and means adjusted in response to different values in the output pressure of said fluid and in response to the movement of said valve for changing the space relation between said baffle and said nozzle, said baffle having a contour of changing slope, said nozzle cooperating with different portions of said contour as said valve operates in different portions of its range whereby equal changes in the said output pressure cause unequal movements of said valve in different positions of its range.

2. In a condition controlling system, a source of pressure fluid, mechanism operable in accordance with variations in a condition to be controlled for throttling said fluid to cause different values of output pressure thereof, means including a spring-loaded pressure fluid operated valve having a given range for applying a correcting medium to control said condition at a predetermined value, said valve being provided with a beveled valve disc, a pneumatic control couple including a baffle element and a nozzle element, the space relation between said elements governing the application of pressure fluid to effect the movement of said valve disc, and means adjusted in response to different values in the output pressure of said fluid and in response to the movement of said valve disc for changing the space relation between said baffle and said nozzle, said baffle element having a convex surface of predetermined contour with different portions of which surface said nozzle cooperates as the position of said valve changes, said baffle element providing with said nozzle element a control effect according to a desired functional relation between the amount of said mechanism movement and the amount of the movement of said valve disc, whereby equal changes in said output pressure cause unequal movements of said valve disc in different portions of its range so that said valve can approximately reproduce the relation of condition change to consequent valve flow of various other types of valves such as those known as ratio plug, throttle plug and the like.

3. In a condition controlling system, a source of pressure fluid, mechanism operable in accordance with variations in a condition to be controlled for throttling said fluid to cause different values of output pressure thereof, means including a spring-loaded pressure fluid operated valve having a given range for applying a correcting medium to control said condition at a predetermined value, said valve being provided with a movable beveled valve disc, a pneumatic control couple including a baffle element and a nozzle element, the space relation between said elements governing the movement of said valve disc, and means adjusted in response to different values in the output pressure of said fluid and in response to the movement of said valve disc for changing the space relation between said baffle and said nozzle, said baffle element having a concave surface of predetermined contour with different portions of which surface said nozzle cooperates as the position of said valve changes, said baffle element providing with said nozzle element a control effect according to a desired functional relation between the amount of said mechanism movement and the amount of the movement of said valve disc, whereby equal changes in said output pressure cause unequal movements of said valve disc in different portions of its range so that said valve can approximately reproduce the relation of condition change to consequent valve flow of various other types of valves such as those known as ratio plug, throttle plug and the like.

4. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, said valve having a movable member, a pneumatic control couple including a baffle element and a nozzle element, the space relation between said elements governing the application of pressure fluid to effect the operation of said valve member, and means adjusted in response to different values in the output pressure of said fluid and in response to the movement of said valve member for changing the space relation between said baffle and said nozzle, said baffle element having an effective curved edge of substantial length, said nozzle in different portions of its operating range cooperating with different portions of said edge, whereby equal changes in said output pressure cause unequal movements of said valve member in different portions of its range so that said valve will change its flow characteristic to substantially approximate markedly different flow characteristic of a different type of valve.

5. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, said valve having a movable member, a pneumatic control couple including a baffle element and a nozzle element, the space relation between said elements governing the movement of said valve member, and means adjusted in response to different values in the output pressure of said fluid and in response to the movement of said valve member for changing the space relation between said baffle and said nozzle, said baffle element comprising a substantially flat plate having a curved outline of substantial length, said nozzle being directed perpendicular to the plane of said plate and in the course of its operating range cooperating with different portions of said outline, whereby equal changes in said output pressure cause unequal movements of said valve member in different portions of its range.

6. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, said valve having a movable valve member of a given shape, a pneumatic control couple including a baffle element and a nozzle element, the space relation between said elements governing the application of pressure fluid to effect the movement of said valve member, and means adjusted in response to different values in the output pressure of said fluid and in response to the movement of said valve member for changing the space relation between said baffle and said nozzle, said baffle element having a convex outline of predetermined contour with different portions of which outline said nozzle cooperates as the position of the valve changes, said baffle element providing with said nozzle element a control effect according to a desired functional relation between the amount of said mechanism movement and the amount of the movement of said valve member, whereby equal changes in said output pressure cause unequal movements of said valve in different portions of its range so that said valve can substantially approximate the flow characteristic of a valve having a valve member of materially different shape.

7. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, said valve having a movable valve member of a given shape, a pneumatic control couple including a baffle element and a nozzle element, the space relation between said elements governing the application of pressure fluid to effect the movement of said valve member, and means adjusted in response to different values in the output pressure of said fluid and in response to the movement of said valve member for changing the space relation between said baffle and said nozzle, said baffle element having a concave outline of predetermined contour with different portions of which outline said nozzle cooperates as the position of the valve changes, said baffle element providing with said nozzle element a control effect according to a desired functional relation between the amount of said mechanism movement and the amount of the movement of said valve member, whereby equal changes in said output pressure cause unequal movements of said valve in different portions of its range so that said valve can substantially approximate the flow characteristic of a valve having a valve member of materially different shape.

8. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, said valve being provided with a movable member, a pneumatic control couple including a baffle element and a nozzle element, said elements having their components of movement in directions substantially perpendicular to each other, the space relation between said elements governing the application of pressure fluid to effect the movement of said valve member, and means adjusted in response to different values in the output pressure of said fluid and in response to the movement of said valve member for changing the space relation between said elements, said baffle having a contour of changing slope determined by the desired flow characteristic to be developed by said valve, said nozzle cooperating with different portions of said contour as said valve operates in different portions of its range whereby equal changes in the said output pressure cause unequal movements of said valve member in different positions of its range.

9. In a condition controlling system, a source of pressure fluid, mechanism operable in accordance with variations in a condition to be controlled for throttling said fluid to cause different values of output pressure thereof, means including a pressure fluid operated valve having a given range for applying a correcting medium to control said condition at a predetermined value, said valve having a movable member, a pneumatic control couple including a baffle element and a nozzle element, one of said elements having its principal component of movement in a horizontal direction and the other element having its principal component of movement in a vertical direction, the space relation between said elements governing the application of pressure fluid to effect the movement of said valve member, and means adjusted in response to different values in the output pressure of said fluid and in response to the movement of said valve member for changing the space relation between said elements, said baffle having a contour of changing slope determined by the desired flow characteristic to be developed by said valve, said nozzle cooperating with different portions of said contour as said valve operates in different portions of its range whereby equal changes in the said output pressure cause unequal movements of said valve member in different positions of its range.

10. In a condition controlling system, a source of pressure fluid, mechanism operable in accordance with variations in a condition to be controlled for throttling said fluid to cause different values of output pressure thereof, means including a pressure fluid operated valve provided with a movable beveled valve disc and having a given range for applying a correcting medium to control said condition at a predetermined value, a pneumatic control couple including a baffle element and a nozzle element, the space relation between said elements governing the application of pressure fluid to operate said valve disc, one element of the couple being adjusted in response to different values in the output pressure of said fluid and the other element of the couple being adjusted in response to the movement of said valve disc, said baffle having a contour of changing slope determined by a desired relation between changes in the condition to be controlled and the fluid flow through said valve, said relation being different from that prevailing in the usual operation of a bevel disc valve, said nozzle cooperating with different portions of its range whereby equal changes in the said output pressure cause varying rates of valve opening in different portions of said contour as said valve operates in different portions of its range so that the flow characteristic of said bevel disc valve can be modified as desired.

11. In a condition controlling system, a source of pressure fluid, mechanism operable in accordance with variations in a condition to be controlled for throttling said fluid to cause different values of output pressure thereof, a pressure fluid operated valve including a movable stem carrying a valve member, a pneumatic control couple including a baffle element and a nozzle element, both of said elements being mounted for movement so that said nozzle directs a jet of pressure fluid against different parts of the contour of said baffle, a relay valve actuated in response to variations in the back pressure of the fluid in said nozzle as the space relation is changed between said nozzle and baffle elements, said relay controlling the application of pressure fluid to operate said stem and valve member, one of said elements being moved proportionately to the movement of said valve stem, a diaphragm responsive to changes in said throttled output pressure for moving the other element of said couple, said baffle element having its contour corresponding to a desired relation between the percentage of travel of the said valve member and the percentage of flow through said valve.

JOHN G. ZIEGLER.

CERTIFICATE OF CORRECTION.

Patent No. 2,388,457. November 6, 1945.

JOHN G. ZIEGLER.

It is hereby certified that error appears in the printed specification of the above numbered patent requiring correction as follows: Page 4, second column, lines 36 and 37, claim 10, strike out the words "of said contour as said valve operates in different portions" and insert the same after "portions" in line 33, same claim; and that the said Letters Patent should be read with this correction therein that the same may conform to the record of the case in the Patent Office.

Signed and sealed this 29th day of January, A. D. 1946.

Leslie Frazer (Seal) First Assistant Commissioner of Patents.